US008789121B2

(12) United States Patent
Vonog et al.

(10) Patent No.: US 8,789,121 B2
(45) Date of Patent: *Jul. 22, 2014

(54) SYSTEM ARCHITECTURE AND METHOD FOR COMPOSING AND DIRECTING PARTICIPANT EXPERIENCES

(71) Applicant: Net Power and Light, Inc., San Francisco, CA (US)

(72) Inventors: Stanislav Vonog, San Francisco, CA (US); Nikolay Surin, San Francisco, CA (US); Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,149

(22) Filed: Feb. 7, 2013

(65) Prior Publication Data
US 2013/0156093 A1      Jun. 20, 2013

Related U.S. Application Data

(63) Continuation of application No. 13/279,096, filed on Oct. 21, 2011, now Pat. No. 8,429,704.

(60) Provisional application No. 61/405,328, filed on Oct. 21, 2010.

(51) Int. Cl.
H04N 7/14      (2006.01)
H04N 7/24      (2011.01)

(52) U.S. Cl.
USPC ............................ 725/109; 705/35; 463/40

(58) Field of Classification Search
USPC .................................................. 725/24, 117
See application file for complete search history.

(56) References Cited

U.S. PATENT DOCUMENTS 5,491,743 A      2/1996    Shiio et al.
6,144,991 A *   11/2000    England ........................ 709/205
(Continued)

FOREIGN PATENT DOCUMENTS

JP      2010-016662      1/2010
KR      10-2002-0038738  5/2002
(Continued)

OTHER PUBLICATIONS

Co-Pending U.S. Appl. No. 13/762,149 of Vonog. S., filed Feb. 7, 2013.

(Continued)

Primary Examiner — Benjamin R Bruckart
Assistant Examiner — Tien M Nguyen
(74) Attorney, Agent, or Firm — Perkins Coie, LLP

(57) ABSTRACT

The present invention contemplates a variety of improved methods and systems for providing an experience platform within a CDN, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. Alternatively, the experience platform may be provided by the CDN, either as an integrated component of the CDN, or a supplemental complimentary aspect. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

30 Claims, 11 Drawing Sheets

(56) References Cited

U.S. PATENT DOCUMENTS

| | | | |
|---|---|---|---|
| 7,171,485 B2 | 1/2007 | Roach et al. | |
| 7,516,255 B1 | 4/2009 | Hobbs | |
| 7,529,259 B2 | 5/2009 | Van Acker et al. | |
| 7,760,640 B2 | 7/2010 | Brown et al. | |
| 8,171,154 B2* | 5/2012 | Vonog et al. | 709/232 |
| 8,234,398 B2* | 7/2012 | Vonog et al. | 709/232 |
| 8,255,552 B2* | 8/2012 | Witt et al. | 709/231 |
| 8,429,704 B2* | 4/2013 | Vonog et al. | 725/109 |
| 8,463,677 B2 | 6/2013 | Vonog et al. | |
| 2002/0051493 A1 | 5/2002 | Shin et al. | |
| 2003/0074554 A1 | 4/2003 | Roach et al. | |
| 2003/0217170 A1 | 11/2003 | Nelson et al. | |
| 2004/0128350 A1 | 7/2004 | Topfl et al. | |
| 2005/0100100 A1 | 5/2005 | Unger | |
| 2007/0217436 A1 | 9/2007 | Markley et al. | |
| 2007/0271580 A1* | 11/2007 | Tischer et al. | 725/35 |
| 2008/0004888 A1 | 1/2008 | Davis | |
| 2008/0039205 A1* | 2/2008 | Ackley et al. | 463/40 |
| 2008/0068449 A1 | 3/2008 | Wu et al. | |
| 2008/0134235 A1 | 6/2008 | Kalaboukis | |
| 2008/0139301 A1 | 6/2008 | Holthe | |
| 2008/0158373 A1 | 7/2008 | Chu | |
| 2008/0181260 A1 | 7/2008 | Vonog et al. | |
| 2008/0205426 A1 | 8/2008 | Grover et al. | |
| 2009/0013263 A1 | 1/2009 | Fortnow et al. | |
| 2009/0046139 A1 | 2/2009 | Cutler et al. | |
| 2009/0100452 A1 | 4/2009 | Hudgeons et al. | |
| 2009/0115843 A1 | 5/2009 | Sohmers | |
| 2009/0118017 A1 | 5/2009 | Perlman et al. | |
| 2009/0183205 A1 | 7/2009 | McCartie et al. | |
| 2009/0186700 A1 | 7/2009 | Konkle | |
| 2009/0239587 A1 | 9/2009 | Negron et al. | |
| 2010/0004977 A1 | 1/2010 | Marci et al. | |
| 2010/0113140 A1 | 5/2010 | Kelly et al. | |
| 2010/0149096 A1 | 6/2010 | Migos et al. | |
| 2010/0156812 A1 | 6/2010 | Stallings et al. | |
| 2010/0185514 A1 | 7/2010 | Glazer | |
| 2010/0257251 A1 | 10/2010 | Mooring et al. | |
| 2010/0268843 A1 | 10/2010 | Van Wie et al. | |
| 2010/0278508 A1 | 11/2010 | Aggarwal | |
| 2011/0046980 A1 | 2/2011 | Metzler et al. | |
| 2011/0103374 A1* | 5/2011 | Lajoie et al. | 370/352 |
| 2011/0116540 A1 | 5/2011 | O'Connor et al. | |
| 2011/0225515 A1 | 9/2011 | Goldman et al. | |
| 2011/0246908 A1 | 10/2011 | Akram et al. | |
| 2011/0271208 A1 | 11/2011 | Jones et al. | |
| 2011/0302532 A1 | 12/2011 | Missig | |
| 2012/0038550 A1 | 2/2012 | Lemmey et al. | |
| 2012/0039382 A1 | 2/2012 | Vonog et al. | |
| 2012/0041859 A1 | 2/2012 | Vonog et al. | |
| 2012/0060101 A1 | 3/2012 | Vonog et al. | |
| 2012/0078788 A1 | 3/2012 | Gandhi | |
| 2012/0082226 A1* | 4/2012 | Weber | 375/240.12 |
| 2012/0084738 A1 | 4/2012 | Sirpal | |
| 2012/0131458 A1 | 5/2012 | Hayes | |
| 2012/0191586 A1 | 7/2012 | Vonog et al. | |
| 2012/0206262 A1 | 8/2012 | Grasso | |
| 2012/0206558 A1 | 8/2012 | Setton | |
| 2012/0206560 A1 | 8/2012 | Setton | |
| 2013/0019184 A1 | 1/2013 | Vonog et al. | |

FOREIGN PATENT DOCUMENTS

| | | |
|---|---|---|
| KR | 10-2006-0062381 | 6/2006 |
| KR | 10-2006-0083034 | 7/2006 |
| KR | 10-2008-0008340 | 1/2008 |
| KR | 10-2009-0113158 | 10/2009 |
| KR | 10-2010-0098668 | 9/2010 |
| WO | WO 02-41121 | 5/2002 |
| WO | WO 2007084994 | 7/2007 |
| WO | WO 2008-072923 | 6/2008 |

OTHER PUBLICATIONS

Non-Final Office Action mailed Mar. 19, 2013, in Co-Pending U.S. Appl. No. 13/367,146, filed Feb. 6, 2012.

Non-Final Office Action mailed Apr. 1, 2013, in Co-Pending U.S. Appl. No. 13/221,801, filed Aug. 30, 2011.

Ettin, Scott A.; "Band of the Hand: Handheld Media Platforms from Palm OS to Pocket PC Pose New Challenges to Video Producers, But They Also Present New Opportunities"; Emedia, The Digital Studio Magazine; 16, 1, 44(2) (Jan. 2003).

Moote, et al.; "Moving Toward a Dual-Infrastructure Facility"; Broadcast Engineering; vol. 46, No. 9, pp. 72-78 (Sep. 2004).

"Broadcom Announces Industry's Most Advanced High Definition AVC Encoder/Transcoder that Transforms the PC into a Multimedia Server"; PR Newswire (Jan. 7, 2008).

International Search Report and Written Opinion of PCT Application No. PCT/US2011/001424, mailed Apr. 6, 2012.

International Search Report and Written Opinion of PCT Application No. PCT/US2011/001425, mailed Apr. 6, 2012.

International Search Report and Written Opinion of PCT Application No. PCT/US2011/057385, mailed May 16, 2012.

International Search Report and Written Opinion of PCT Application No. PCT/US2011/047815, mailed Apr. 9, 2012.

International Search Report and Written Opinion of PCT Application No. PCT/US2011/047814, mailed Apr. 9, 2012.

Co-Pending U.S. Appl. No. 13/136,869 of Vonog, S., et al., filed Aug. 12, 2011.

Co-Pending U.S. Appl. No. 13/367,146 of Vonog, S., et al., filed Feb. 6, 2012.

Co-Pending U.S. Appl. No. 13/136,870 of Vonog, S., et al., filed Aug. 12, 2011.

Co-Pending U.S. Appl. No. 13/363,187 of Vonog, S., et al., filed Jan. 31, 2012.

Co-Pending U.S. Appl. No. 13/221,801 of Vonog, S., et al., filed Aug. 30, 2011.

Co-Pending U.S. Appl. No. 13/279,096 of Vonog, S., et al., filed Oct. 21, 2011.

Co-Pending U.S. Appl. No. 13/210,370 of Lemmey, T., et al., filed Aug. 15, 2011.

Co-Pending U.S. Appl. No. 13/461,680 of Vonog, S., et al., filed May 1, 2012.

Co-Pending U.S. Appl. No. 13/546,906 of Vonog, S., et al., filed Jul. 11, 2012.

Co-Pending U.S. Appl. No. 13/694,582 of Lemmey, T., et al., filed Dec. 12, 2012.

Co-Pending U.S. Appl. No. 13/694,581 of Vonog, S., et al., filed Dec. 12, 2012.

Non-Final Office Action mailed Sep. 11, 2012, in Co-Pending U.S. Appl. No. 13/136,869 of Vonog, S., et al., filed Sep. 7, 2012.

Notice of Allowance mailed Sep. 4, 2013, in Co-Pending U.S. Appl. No. 13/367,146 of Vonog, S., et al., filed Feb. 6, 2012.

Final Office Action mailed Aug. 15, 2013, in Co-Pending U.S. Appl. No. 13/221,801 of Vonog, S., et al., filed Aug. 30, 2011.

Notice of Allowance mailed Feb. 4, 2013, in Co-Pending U.S. Appl. No. 13/279,096 of Vonog, S., et al., filed Oct. 21, 2011.

* cited by examiner

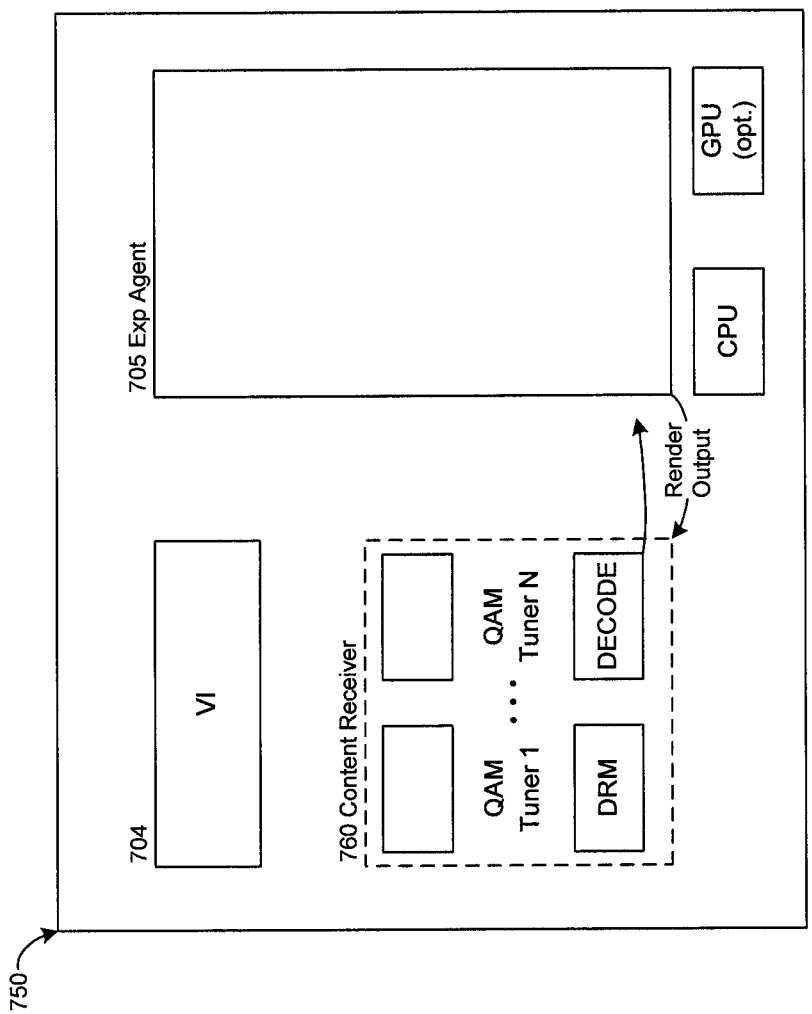
FIG. 7A (TV/CABLE)

SYSTEM ARCHITECTURE AND METHOD FOR COMPOSING AND DIRECTING PARTICIPANT EXPERIENCES

CLAIM OF PRIORITY

This application is a continuation of U.S. patent application Ser. No. 13/279,096, filed Oct. 21, 2011, entitled "SYSTEM ARCHITECTURE AND METHOD FOR COMPOSING AND DIRECTING PARTICIPANT EXPERIENCES," which is a non-provisional and claims priority to U.S. Provisional Patent Application Ser. No. 61/405,328 filed Oct. 21, 2010, the entire disclosure of which are hereby expressly incorporated by reference.

BACKGROUND OF INVENTION

Field of Invention

The present teaching relates to experience platforms in communication with a content distribution network (CDN) enabling an experience provider to direct and compose an experience for one or more participants, which experience may involve a variety of dimensions including video, group participation, gesture recognition, heterogeneous device use, emotions, etc.

SUMMARY OF THE INVENTION

The present invention contemplates a variety of improved methods and systems for providing an experience platform in communication with a CDN, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. Alternatively, the experience platform may be provided by the CDN, either as an integrated component of the CDN, or a supplemental complimentary aspect. The participant experience can involve one or more experience participants. The experience provider can create an experience with a variety of dimensions and features. The experience can be encoded and transmitted via a low-latency protocol. The low-latency transmission protocol comprises steps of dividing the realtime participant experience into a plurality of regions, wherein the realtime participant experience includes full-motion video, wherein the full-motion video is enclosed within one of the plurality of regions; converting each portion of the realtime participant experience associated with each region into at least one of picture codec data and pass-through data; and smoothing a border area between the plurality of regions. As will be appreciated, the following description provides one paradigm for understanding the multi-dimensional experience available to the participants. There are many suitable ways of describing, characterizing and implementing the experience platform contemplated herein.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIG. 7A illustrates a device for presenting and participating multi-dimensional real-time participant experiences, in accordance with a further embodiment;

DETAILED DESCRIPTION OF THE INVENTION

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

The following discussion contains definitions of specific terms used in this disclosure. These definitions are intended to clarify the meanings of the terms used herein. It is believed that the terms are used in a manner consistent with their ordinary meaning, but the definitions are nonetheless specified here for clarity.

In this disclosure, updating or processing data "in realtime" means that the data are updated or processed on a regular basis. For example, the data may be updated and processed minute-by-minute, second-by-second, or even frame-by-frame. Thus, "realtime" is not intended to require that the process is "instantaneous."

Figure 1:
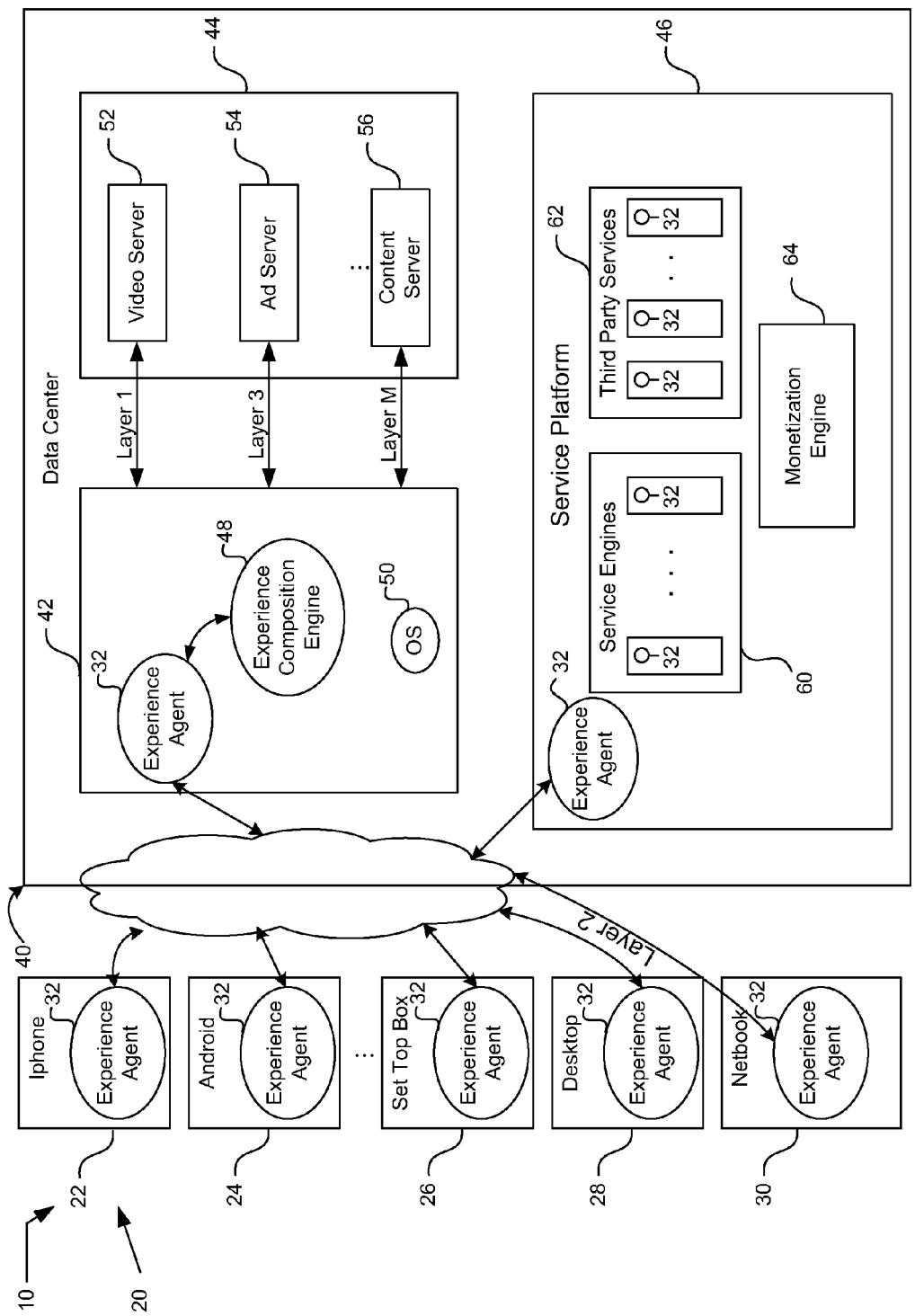
FIG. 1 illustrates a system architecture for composing and directing user experiences.
Figure 4:
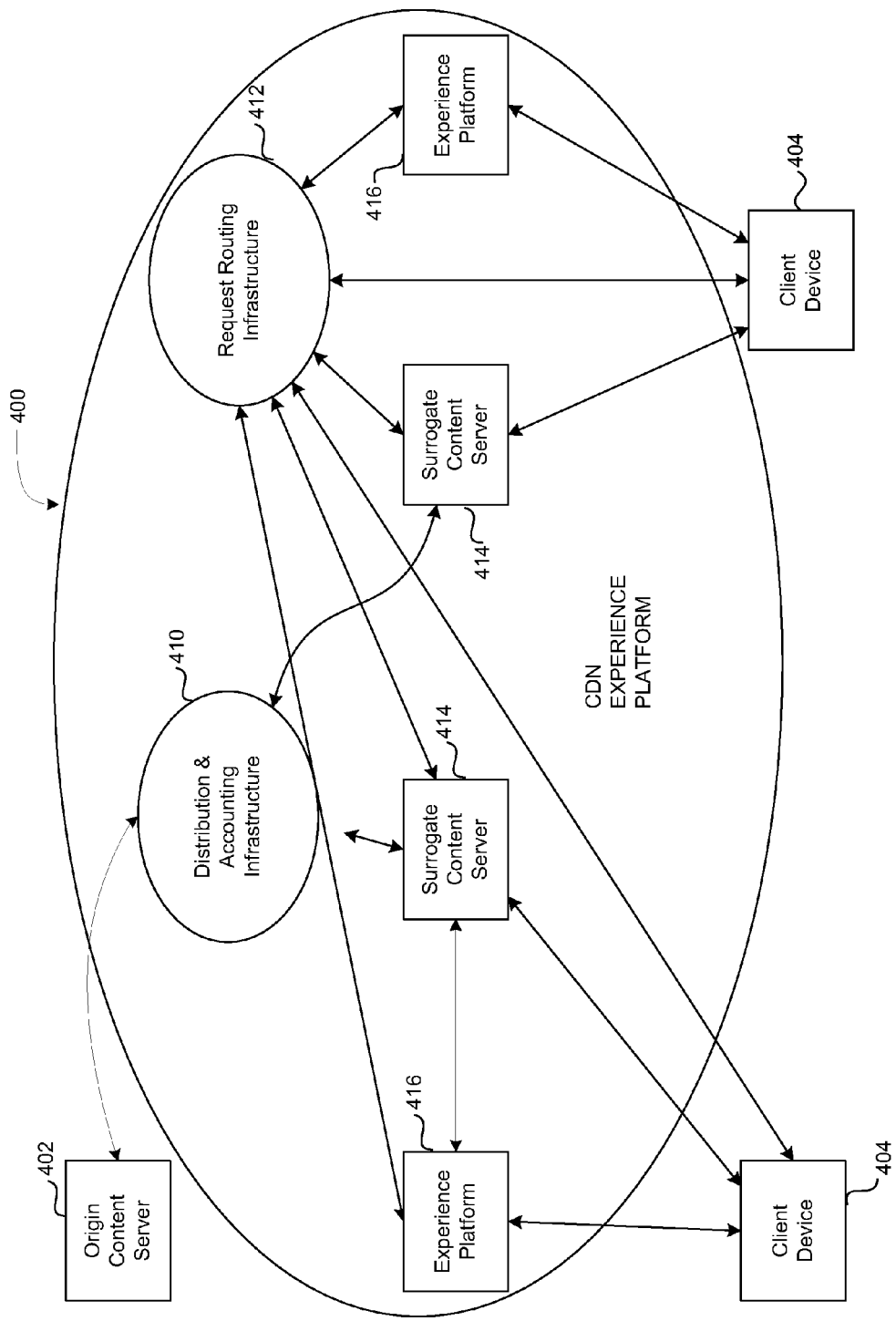
FIG. 4 illustrates an experience platform integrated within a conventional content distribution network (CDN)
Figure 5:
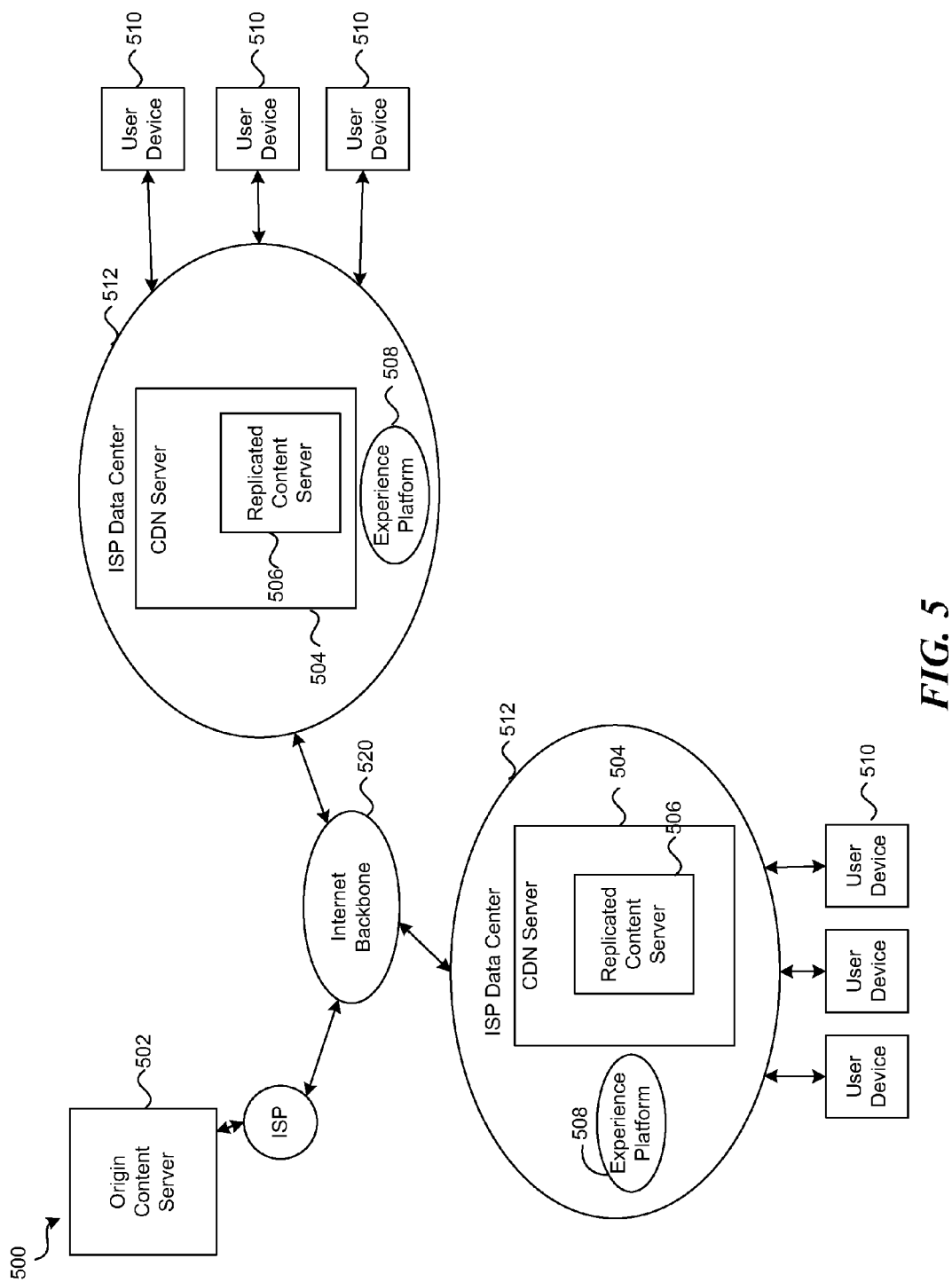
FIG. 5 illustrates an experience platform operating separate and supporting content and experience delivery in a CDN.

FIG. 1 illustrates a block diagram of a system 10. The system 10 can be viewed as an "experience platform" or system architecture for composing and directing a participant experience. In one embodiment, the experience platform 10 is provided by a service provider to enable an experience provider to compose and direct a participant experience. As shown in FIG. 4 below, the experience platform 10 may be integrated into a content distribution network (CDN) infrastructure. Alternatively, as shown in FIG. 5 below, the experience platform may be provided as a supplemental and distinct aspect of a CDN. The participant experience can involve one or more experience participants. The experience provider can create an experience with a variety of dimensions, as will be explained further now. As will be appreciated, the following description provides one paradigm for understanding the multi-dimensional experience available to the participants.

There are many suitable ways of describing, characterizing and implementing the experience platform contemplated herein.

In general, services are defined at an API layer of the experience platform. The services provide functionality that can be used to generate "layers" that can be thought of as representing various dimensions of experience. The layers form to make features in the experience.

By way of example, the following are some of the services and/or layers that can be supported on the experience platform.

Video—is the near or substantially real-time streaming of the video portion of a video or film with near real-time display and interaction.

Video with Synchronized DVR—includes video with synchronized video recording features.

Synch Chalktalk—provides a social drawing application that can be synchronized across multiple devices.

Virtual Experiences—are next generation experiences, akin to earlier virtual goods, but with enhanced services and/or layers.

Video Ensemble—is the interaction of several separate but often related parts of video that when woven together create a more engaging and immersive experience than if experienced in isolation.

Explore Engine—is an interface component useful for exploring available content, ideally suited for the human/computer interface in a experience setting, and/or in settings with touch screens and limited i/o capability Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Turning back to FIG. 1, the experience platform 10 includes a plurality of devices 20 and a data center 40. The devices 12 may include devices such as an iPhone 22, an android 24, a set top box 26, a desktop computer 28, and a netbook 30. At least some of the devices 12 may be located in proximity with each other and coupled via a wireless network. In certain embodiments, a participant utilizes multiple devices 12 to enjoy a heterogeneous experience, such as using the iPhone 22 to control operation of the other devices. Multiple participants may also share devices at one location, or the devices may be distributed across various locations for different participants.

Each device 12 has an experience agent 32. The experience agent 32 includes a sentio codec and an API. The sentio codec and the API enable the experience agent 32 to communicate with and request services of the components of the data center 40. The experience agent 32 facilitates direct interaction between other local devices. Because of the multi-dimensional aspect of the experience, the sentio codec and API are required to fully enable the desired experience. However, the functionality of the experience agent 32 is typically tailored to the needs and capabilities of the specific device 12 on which the experience agent 32 is instantiated. In some embodiments, services implementing experience dimensions are implemented in a distributed manner across the devices 12 and the data center 40. In other embodiments, the devices 12 have a very thin experience agent 32 with little functionality beyond a minimum API and sentio codec, and the bulk of the services and thus composition and direction of the experience are implemented within the data center 40.

Data center 40 includes an experience server 42, a plurality of content servers 44, and a service platform 46. As will be appreciated, data center 40 can be hosted in a distributed manner in the "cloud," and typically the elements of the data center 40 are coupled via a low latency network. The experience server 42, servers 44, and service platform 46 can be implemented on a single computer system, or more likely distributed across a variety of computer systems, and at various locations.

The experience server 42 includes at least one experience agent 32, an experience composition engine 48, and an operating system 50. In one embodiment, the experience composition engine 48 is defined and controlled by the experience provider to compose and direct the experience for one or more participants utilizing devices 12. Direction and composition is accomplished, in part, by merging various content layers and other elements into dimensions generated from a variety of sources such as the service provider 42, the devices 12, the content servers 44, and/or the service platform 46.

The content servers 44 may include a video server 52, an ad server 54, and a generic content server 56. Any content suitable for encoding by an experience agent can be included as an experience layer. These include well know forms such as video, audio, graphics, and text. As described in more detail earlier and below, other forms of content such as gestures, emotions, temperature, proximity, etc., are contemplated for encoding and inclusion in the experience via a sentio codec, and are suitable for creating dimensions and features of the experience.

The service platform 46 includes at least one experience agent 32, a plurality of service engines 60, third party service engines 62, and a monetization engine 64. In some embodiments, each service engine 60 or 62 has a unique, corresponding experience agent. In other embodiments, a single experience 32 can support multiple service engines 60 or 62. The service engines and the monetization engines 64 can be instantiated on one server, or can be distributed across multiple servers. The service engines 60 correspond to engines generated by the service provider and can provide services such as audio remixing, gesture recognition, and other services referred to in the context of dimensions above, etc. Third party service engines 62 are services included in the service platform 46 by other parties. The service platform 46 may have the third-party service engines instantiated directly therein, or within the service platform 46 these may correspond to proxies which in turn make calls to servers under control of the third-parties.

Monetization of the service platform 46 can be accomplished in a variety of manners. For example, the monetization engine 64 may determine how and when to charge the experience provider for use of the services, as well as tracking for payment to third-parties for use of services from the third-party service engines 62.

Figure 2:
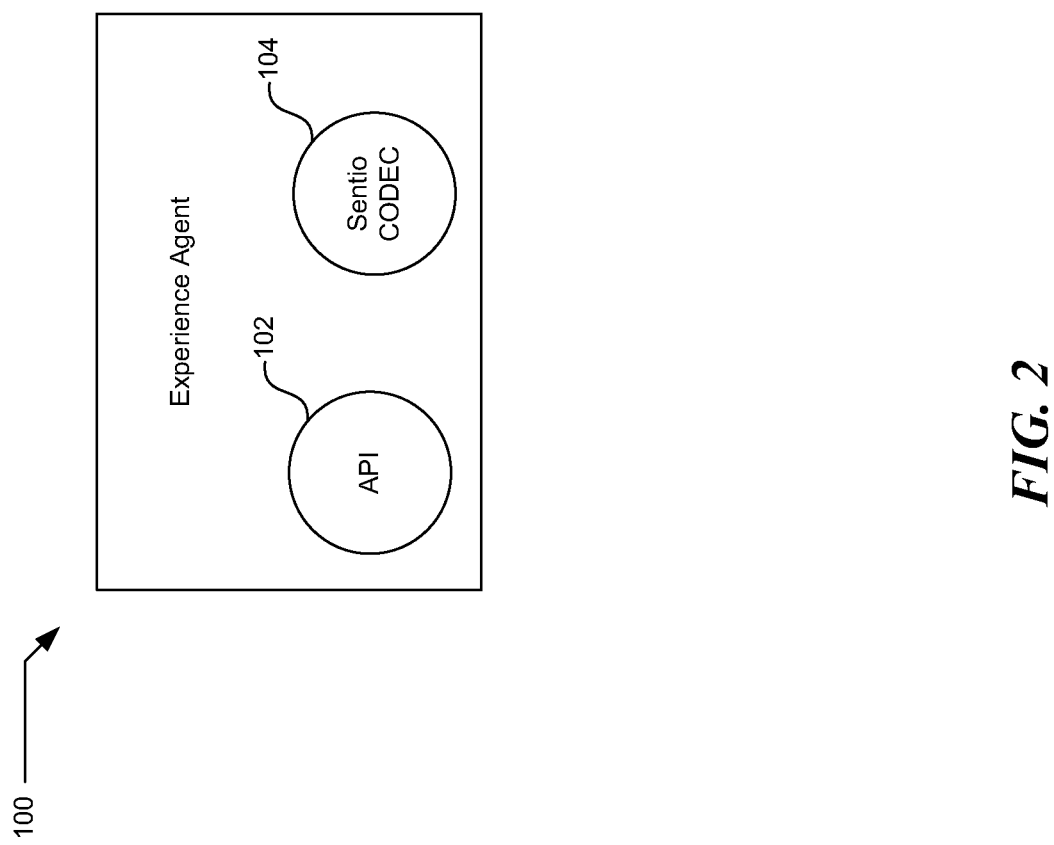
FIG. 2 is a block diagram of an experience agent.

FIG. 2 illustrates a block diagram of an experience agent 100. The experience agent 100 includes an application programming interface (API) 102 and a sentio codec 104. The API 102 is an interface which defines available services, and enables the different agents to communicate with one another and request services.

The sentio codec 104 is a combination of hardware and/or software which enables encoding of many types of data streams for operations such as transmission and storage, and decoding for operations such as playback and editing. These data streams can include standard data such as video and audio. Additionally, the data can include graphics, sensor data, gesture data, and emotion data. ("Sentio" is Latin roughly corresponding to perception or to perceive with one's senses, hence the nomenclature "sensio codec.")

Figure 3:
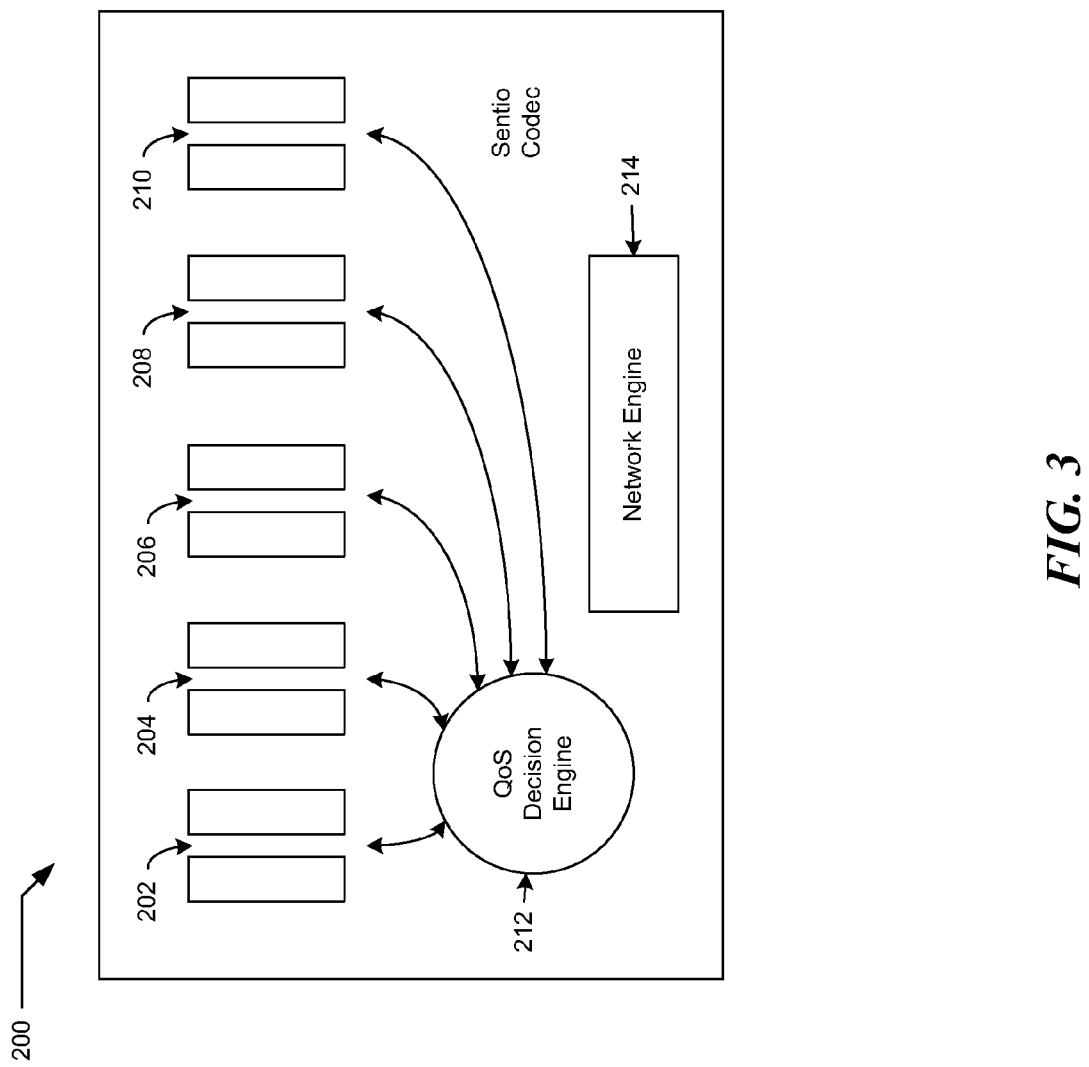
FIG. 3 is a block diagram of a sentio codec.

FIG. 3 illustrates a block diagram of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of service (QoS) decision engine 212 and a network engine 214. The codecs, the QoS decision engine 212, and the network engine 214 work together to encode one or more data streams and transmit the encoded data according to a low-latency transfer protocol supporting the various encoded data types. One example of this low-latency protocol is described in more detail in Vonog, et al.'s U.S. patent application Ser. No. 12/569,876, filed Sep. 29, 2009, and incorporated herein by reference for all purposes including the low-latency protocol and related features such as the network engine and network stack arrangement.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding with many different senses or dimensions of an experience. For example, a device 12 may include a video camera capturing video images and audio from a participant. The user image and audio data may be encoded and transmitted directly or, perhaps after some intermediate processing, via the experience composition engine 48, to the service platform 46 where one or a combination of the service engines can analyze the data stream to make a determination about an emotion of the participant. This emotion can then be encoded by the sentio codec and transmitted to the experience composition engine 48, which in turn can incorporate this into a dimension of the experience. Similarly a participant gesture can be captured as a data stream, e.g., by a motion sensor or a camera on device 12, and then transmitted to the service platform 46, where the gesture can be interpreted, and transmitted to the experience composition engine 48 or directly back to one or more devices 12 for incorporation into a dimension of the experience.

FIG. 4 illustrates a block diagram of a CDN experience architecture (CDNEA) 400 with integrated experience platforms. The experience platforms may be similar in architecture to the experience platform 10 described above with reference to FIG. 1, or may take any other suitable form. An origin content server 402 provides at least some of the content intended to be delivered as part of an experience to users operating client devices 404. Those skilled in the art will be familiar with the operation of CDNs, and how content is replicated throughout the network for efficient provision. The CDNEA 400 includes distribution and accounting infrastructure 410, request routing infrastructure 412, surrogate content servers 414, and experience platforms 416. The CDNEA 400 provides an architecture where the experience aspects are built in as part of the CDN. Other embodiments are contemplated where the experience platform is separate from the CDN, as described below with reference to FIG. 5, but still enabling experiences.

Distribution and accounting infrastructure 410 manages distribution of content from the origin content server 402 to enable distribution of content in a timely and efficient manner across disparate geographic locations via surrogate content servers 414. In practice, a client 404 queries the request routing infrastructure 412 for instructions. The request routing infrastructure in turn directs the client 404 to connect with the best surrogate content platform 414 and/or experience platform 416. The experience platforms 416 can be in direct communication with each other to enable and provide an experience to participants interacting via the client devices 404. Additionally, live and static content from the CDN can be integrated into the participant experience. The replicated content can be provided as a layer integrated into the experience at any suitable location of the experience platform, including the client device 404.

FIG. 5 illustrates a block diagram of an experience platform service supplementing and overlaid on a conventional CDN architecture 500. The architecture 500 includes an origin content server 502, a plurality of CDN servers 504 each including a replicated or surrogate content server 506, a plurality of experience platforms 508, and a plurality of client or user devices 510. Each associated pair of surrogate content server 506 and experience platform 508 is hosted at an ISP data center 512, and the Internet backbone 520 provides a communications link between the different components of the CDN architecture 500. In this embodiment, the experience platform is not directly integrated into the distribution and accounting infrastructure (not shown) of the conventional CDN architecture, but rather operates in parallel to provide experiences to participants operating the user devices 510.

Figure 6:
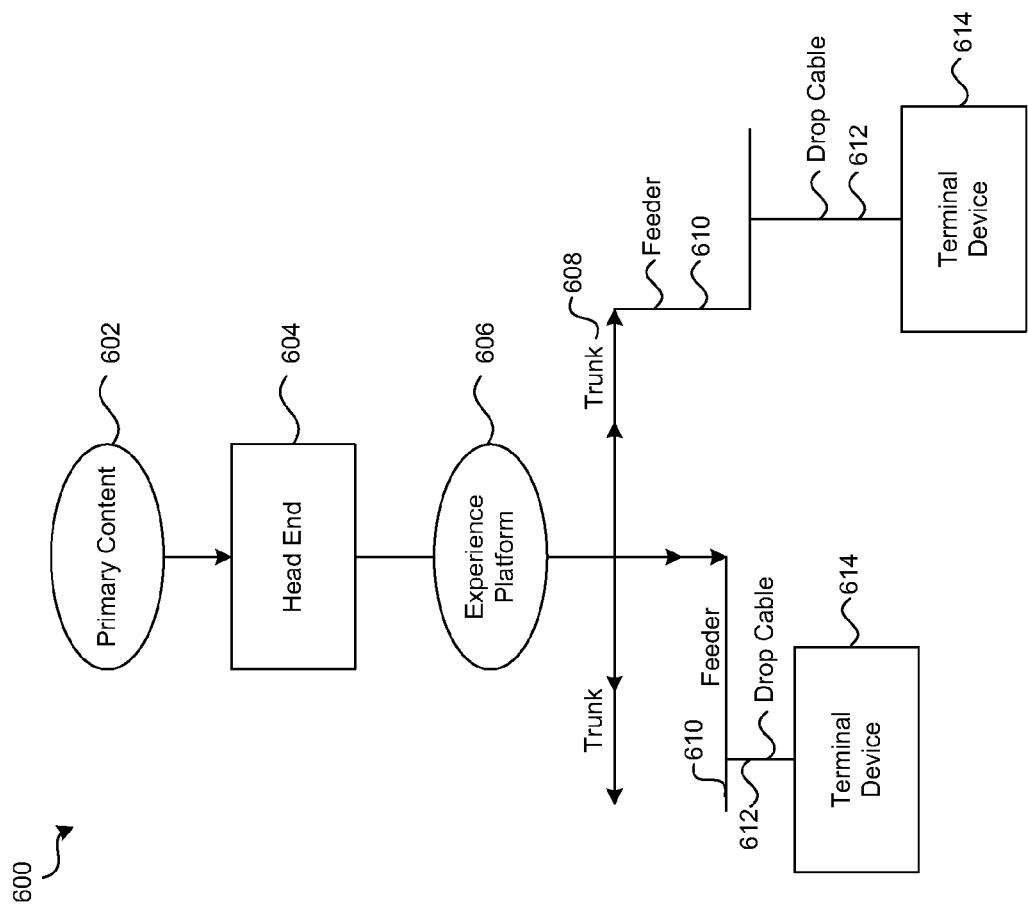
FIG. 6 illustrates a cable television delivery system with an integrated experience platform.

FIG. 6 illustrates a block diagram of a cable television network 600 with an integrated experience platform. The cable television network 600 includes a primary content server 602, a head end 604, an experience platform 606, a trunk 608, feeder cables 610, drop cables 612, and terminal devices 614. As will be appreciated, the head end 604 is the master facility for receiving television or other content signals from the primary content server for processing and distribution over a cable television system. The trunk 608 is the high bandwidth backbone delivering content to various neighborhoods, while the feeder 608 breaks off from the trunk 608 in each neighborhood, and the drop cables 612 deliver content directly to terminal devices 614. In the example of FIG. 6, a component of the experience platform 606 in placed in series coupling the head end 604 with the trunk 608. This way, the various layers of an experience can be merged prior to distribution through the cable television network. Other experience platform components can be distributed throughout the cable television network 600 to provide aspects of an experience. Alternatively, the experience platform can be distributed across the cable television network, instead of being found in series with the head end 604. In any event, the experience platform can work with content from the cable television network 600 to provide an experience to participants operating the terminal devices 614.

Figure 7:
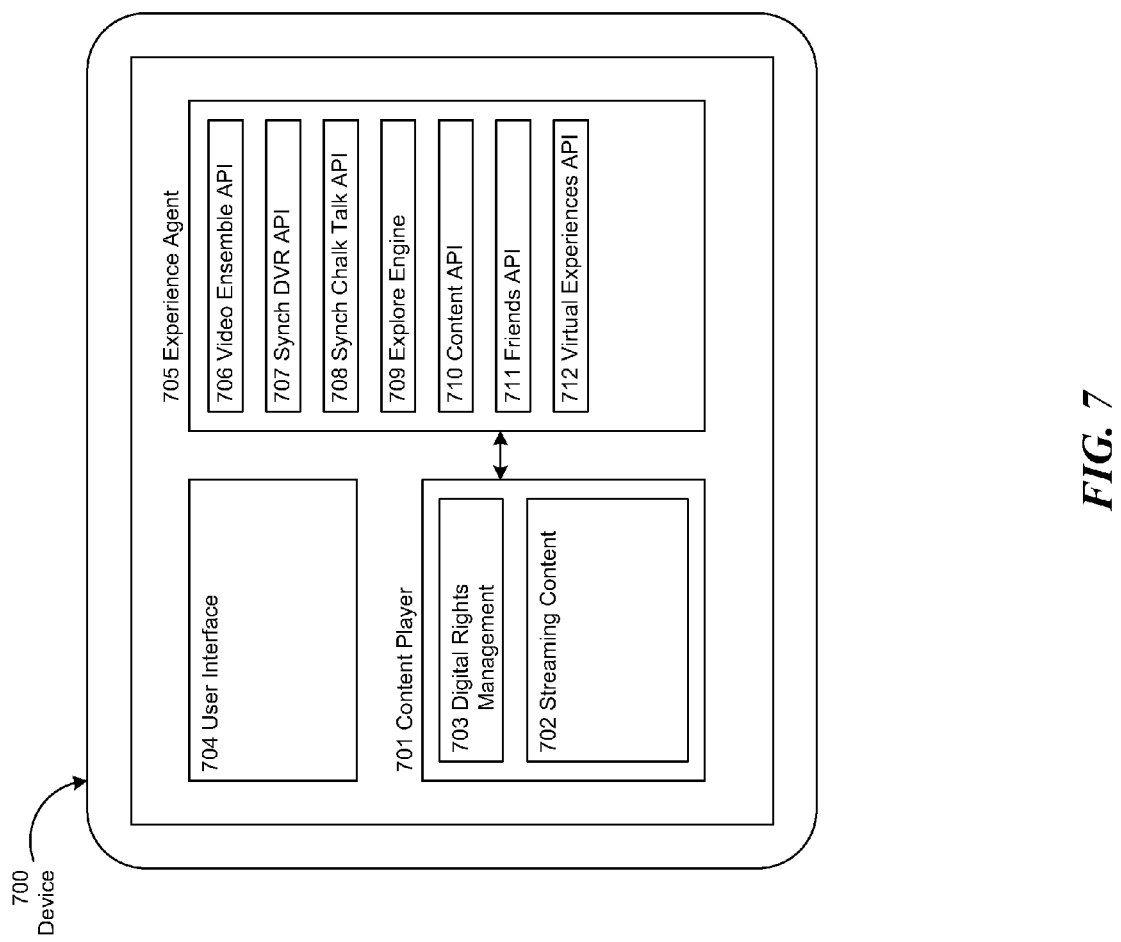
FIG. 7 illustrates a device for presenting and participating multi-dimensional realtime participant experiences, in accordance with one embodiment.

FIG. 7 illustrates a device 700 for presenting and participating multi-dimensional realtime participant experiences. The device 700 comprises a content player 701, a user interface 704 and an experience agent 705. The content player 701 presents to a user of the device 700 a streaming content 702 received from a content distribution network. The user interface 704 is operative to receive an input from the user of the device 700. The experience agent 705 presents one or more live realtime participant experiences transmitted from one or more realtime participant experience engines typically via a low-latency protocol, on top of or in proximity of the streaming content 702. In some embodiments, the experience agent 705 presents the live realtime participant experience by sending the experience to the content player 701, so that the content player 701 displays the streaming content 702 and the live realtime participant experience in a multi-layer format. In some embodiments, the experience agent is operative to overlap the live realtime participant experiences on the streaming content so that the device presents multi-layer realtime participant experiences.

In some embodiments, the low-latency protocol to transmit the realtime participant experience comprises steps of dividing the realtime participant experience into a plurality of regions, wherein the realtime participant experience includes full-motion video, wherein the full-motion video is enclosed within one of the plurality of regions; converting each portion of the realtime participant experience associated with each region into at least one of picture codec data and pass-through data; and smoothing a border area between the plurality of regions.

In some embodiments, the experience agent 705 is operative to receive and combine a plurality of realtime participant experiences into a single live stream.

In some embodiments, the experience agent 705 may communicate with one or more non-realtime services. The experience agent 705 may include some APIs to communicate with the non-realtime services. For example, in some embodiment, the experience agent 705 may include content API 710 to receive a streaming content search information from a non-realtime service. In some other embodiments, the experience agent 705 may include friends API 711 to receive friends' information from a non-realtime service.

In some embodiments, the experience agent 705 may include some APIs to receive live realtime participant experiences from realtime experience engines. For example, the experience agent may have a video ensemble API 706 to receive a video ensemble realtime participant experience from a video ensemble realtime experience engine. The experience agent 705 may include a synch DVR API 707 to receive a synch DVR realtime participant experience from a synch DVR experience engine. The experience agent 705 may include a synch chalktalk API 708 to receive a chalktalk realtime participant experience from a chalktalk experience engine. The experience agent 705 may include a virtual experience API 712 to receive a realtime participant virtual experience from a realtime virtual experience engine. The experience agent 705 may also include an explore engine.

The streaming content 702 may a live or on-demand streaming content received from the content distribution network. The streaming content 702 may be received via a wireless network. The streaming content 702 may be controlled by a digital rights management (DRM). In some embodiments, the experience agent 705 may communicate with one or more non-realtime services via a human-readable data interchange format such as HTTP JSON.

As will be appreciated, the experience agent 705 often requires certain base services to support a wide variety of layers. These fundamental services may include the sentio codec, device presence and discovery services, stream routing, i/o capture and encode, layer recombination services, and protocol services. In any event, the experience agent 705 will be implemented in a manner suitable to handle the desired application.

Multiple devices 700 may receive live realtime participant experiences using the experience agent of each own. All of the live realtime participant experiences presented by the devices may be received from a particular ensemble of a realtime experience engine via a low-latency protocol.

As will be appreciated, the above described content player 701 is simply one possible example for playing or instantiating content locally. FIG. 7A illustrates a device 750 such as a smart TV or set top box. In this specific example, the device 750 includes a content received 760 with the "content player" including hardware for receiving content (e.g. video from a head end) and any necessary decoders and DRM devices/functionality. The received content is not limited to video, that is, the system could be implemented, like or akin to a browser, to receive and process HTML, JavaScript, Ajax, and/or a variety of documents like HTML documents, pdf, Word, and/or images, animations, etc. All this varying content would be decoded/rendered and played, interpreted, viewed, browsed, or accessed/presented as necessary, all the while synchronized with other layers as the embodiment requires. In other embodiments, a player may not even be necessary, as all content can be delivered via layers, and thus rendered (if necessary) by the experience agent.

Figure 8:
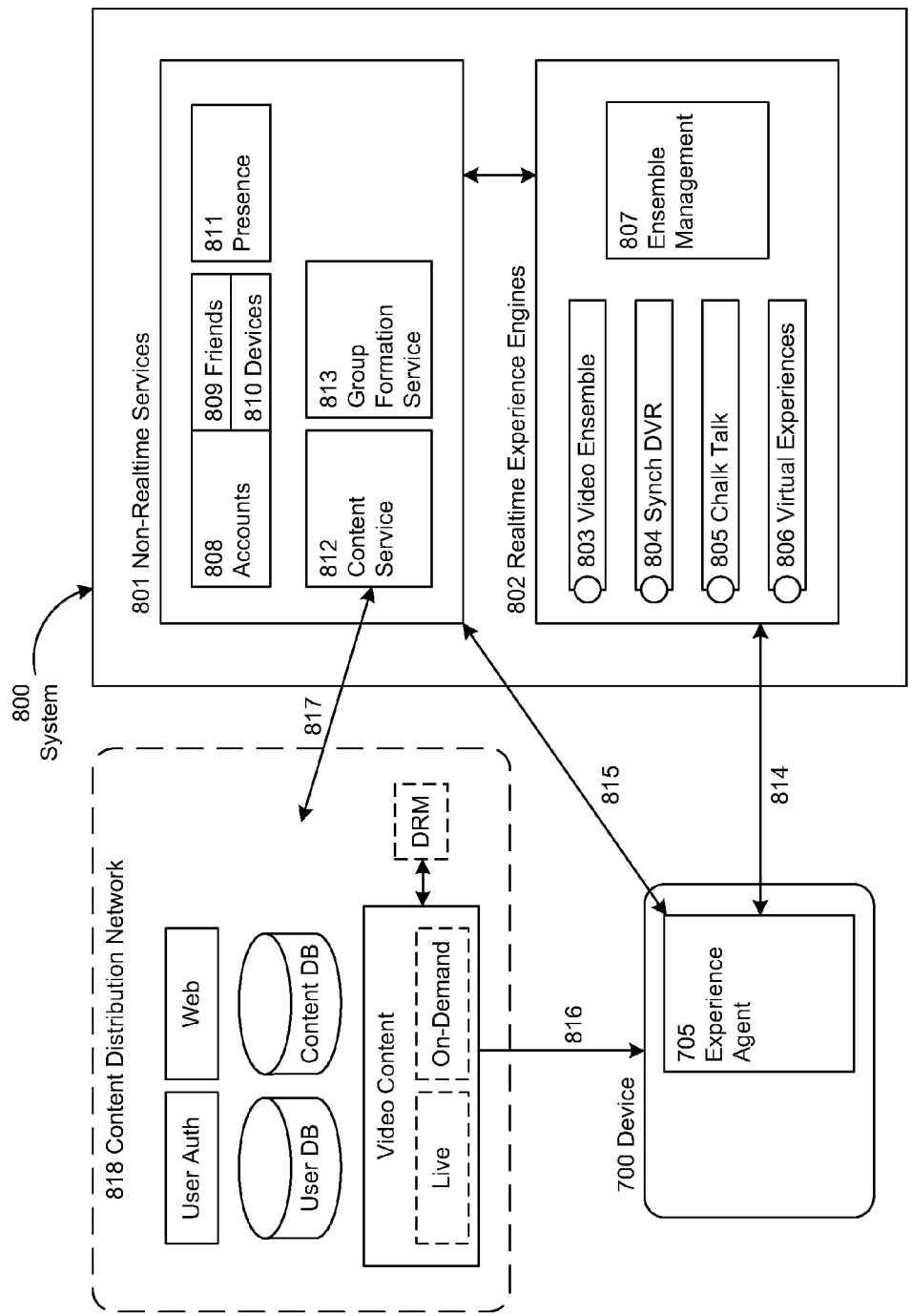
FIG. 8 illustrates a system for composing and directing multi-dimensional realtime participant experiences, in accordance with another embodiment.

FIG. 8 illustrates a system for composing and directing multi-dimensional realtime participant experiences. The system 800 includes a plurality of realtime experience engines 802 and a plurality of non-realtime services 801. Each of the realtime experience engines is operative to transmit a realtime participant experience to an experience agent 705 via a low-latency protocol and communicate with one or more non-realtime services 801. Each of the non-realtime services is operative to communicate with the experience agent 705 and to communicate with one or more realtime experience engines 802. Some of the realtime experience engine may be operative to convert a plurality of realtime participant experiences into a single live stream.

In some embodiments, the realtime experience is transmitted via a low latency protocol 814 though networks. The content distribution network 818 transmits a streaming content via a common network protocol 816 such as HTTP to device 700.

In some embodiments, the low-latency protocol to transmit the realtime participant experience may comprise steps of: dividing the realtime participant experience into a plurality of regions, wherein the realtime participant experience includes full-motion video, wherein the full-motion video is enclosed within one of the plurality of regions; converting each portion of the realtime participant experience associated with each region into at least one of picture codec data and pass-through data; and smoothing a border area between the plurality of regions.

In some embodiments, the plurality of non-realtime services 801 may include a content service 812 operative to receive a streaming content search result from a content distribution network 818. The plurality of non-realtime services 801 may include an account service 808 to maintain account information including friends information 809 and devices information 810. The plurality of non-realtime services 801 may include a presence service 811 operative to generate and transmit a presence notification. The plurality of non-realtime services 801 may include a group formation service 813 operative to form a group based on the account information from the account service 808.

In some embodiments, the plurality of realtime experience engines 802 may include a video ensemble engine 803 operative to transmit a video ensemble realtime participant experience. The plurality of realtime experience engines 802 may include a synch DVR engine 804 operative to transmit a synch DVR realtime participant experience. The plurality of realtime experience engines 802 may include a synch chalktalk engine 805 operative to transmit a synch chalktalk realtime participant experience. The plurality of realtime experience engines 802 may include a virtual experience engine 806 operative to transmit a realtime participant virtual experience.

Figure 9:
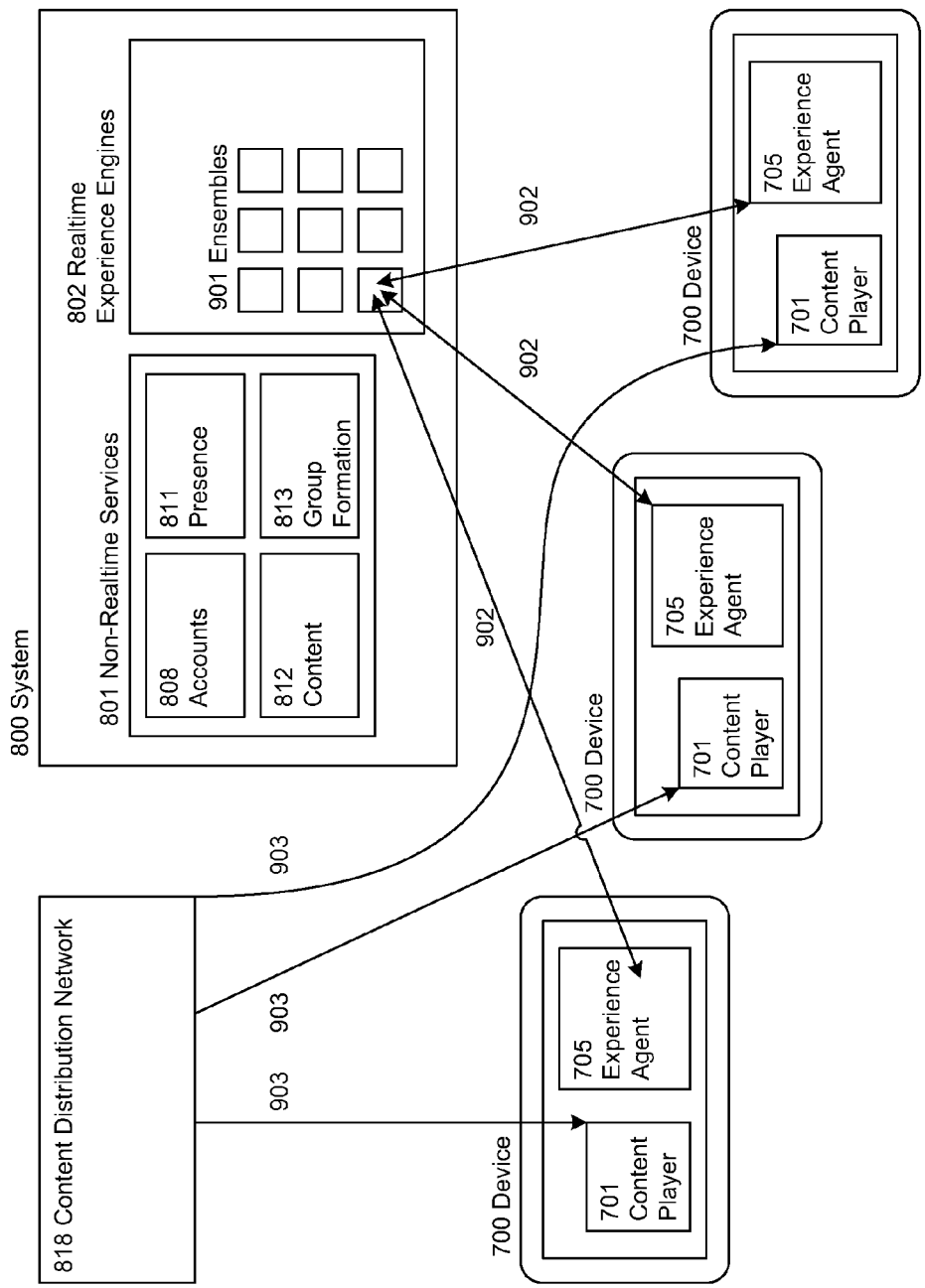
FIG. 9 illustrates a system for composing and directing multi-dimensional realtime participant experiences, in accordance with yet another embodiment.

As shown in FIG. 9, in some embodiments, at least one of the realtime experience engines is operative to generate an ensemble 901 of realtime participant experiences and transmit each realtime participant experience of the ensemble to an experience agent. In some embodiment, the plurality of realtime experience engines comprises an ensemble management engine 807 operative to form an ensemble for a plurality of realtime experiences. In some embodiments, the realtime experience from the same ensemble is transmitted via a low latency protocol 902 though networks. The content distribution network 818 transmits a streaming content via networks 903 to a plurality of devices 700.

In some embodiments, a system for composing and directing multi-dimensional realtime participant experiences is implemented within a content distribution network (CDN). The system includes a CDN infrastructure including an origin content server and a plurality of surrogate content servers. The CDN infrastructure is operable to distribute content across various geographic locations. The system also includes a plurality of realtime experience engines, a plurality of non-realtime services and a plurality of devices. Each device includes a content player presenting a streaming content received from the content distribution network. The device further includes an experience agent presenting one or more live realtime participant experiences transmitted from one or more realtime experience engines via a low-latency protocol. Each of the realtime experience engines is operative to transmit a realtime participant experience to at least one of the experience agents via a low-latency protocol and communicate with one or more non-realtime services. Each of the non-realtime services is operative to communicate with at least one of the experience agents, and communicate with one or more realtime experience engines.

Stepping back and considering the integration of an experience platform into a CDN framework, those skilled in the art will readily recognize that there are a variety of ways to accomplish such an integration. With respect to FIGS. 8-9, e.g., a case where there CDN sends content (e.g., video, images, HTML, graphics, audio, pdf, etc.) directly to individual devices, and experience agents on the devices enable all other layers either rendering locally in communication with an experience platform's real-time and/or non-real-time services, or received layers from a real-time experience platform.

Figure 10:
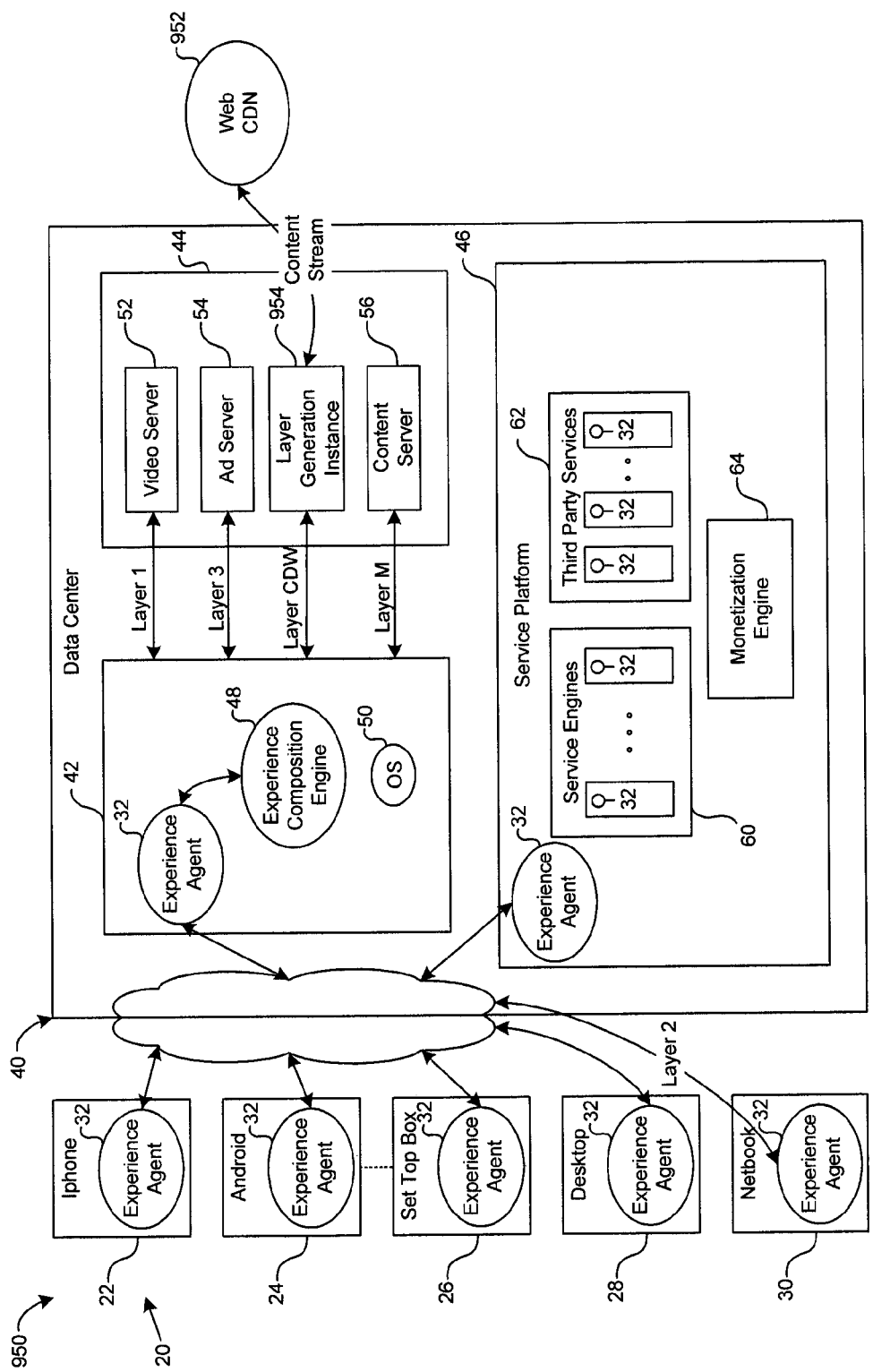
FIG. 10 illustrates a system for composing and directing multi-dimensional real-time participant experiences, with content delivered via a CDN incorporated into the experience processing pipeline, in accordance with still another embodiment.

Alternatively, one or more content streams flow from a CDN to an instance of an experience platform, integrating into a processing pipeline consisting of one or more services (devices) of the experience platform and the experience platform sends the final processed stream as "a layer" to the person's device. One possible embodiment is shown in a system 950 of FIG. 10, which will be noted as an extension of FIG. 1. In FIG. 10, a web CDN 952 provides a content stream over to a layer generation instance 954 located at a data center 40, which in turn generates a layer provided to experience platform 42.

As will be appreciated, certain embodiments may provide multiple CDN arising content streams fed into the experience platform processing pipeline. Additionally, CDN originating content can be fed into the pipeline, and different CDN originating content can be delivered directly to end devices (i.e., a combination of both described instances.)

In some embodiments, the device may include a user interface operative to receive an input from a user of the device. The experience agent may be operative to communicate with at least one of the non-realtime services. In some embodiments, the low-latency protocol to transmit the realtime participant experience comprises steps of dividing the realtime participant experience into a plurality of regions, wherein the realtime participant experience includes full-motion video, wherein the full-motion video is enclosed within one of the plurality of regions; converting each portion of the realtime participant experience associated with each region into at least one of picture codec data and pass-through data; and smoothing a border area between the plurality of regions.

In some embodiments, a system for composing and directing multi-dimensional realtime participant experiences is implemented within a content distribution network (CDN).

The system is facilitated via a low-latency transmission protocol and sentio codecs for encoding and decoding multi-dimensional data streams. the system provided by a service provider for use by an experience provider, the system comprising a plurality of devices, an experience server, a CDN infrastructure, a content server and a service platform. Each device includes a specific experience agent. Each specific experience agent includes a specific API and a specific sentio codec. The experience server is in communication with the plurality of devices. The experience server includes a first experience agent. The first experience agent includes a first API and a first sentio codec. The experience server also includes the experience composition engine. The CDN infrastructure includes an origin content server and a plurality of surrogate content servers. The CDN infrastructure is operable to distribute content to participants across various geographic locations. The content server is in communication with the experience server and is operable to provide a first content layer to the experience composition engine. The service platform is in communication with and is operable to provide services to the plurality of devices and the experience server. The service platform includes a plurality of service engines and a second experience agent including a second API and a second sentio codec. The service of at least one service engine is exposed via the second API. The experience composition engine is operable to receive layers from the content server and the plurality of devices; request services from the service platform via the first experience agent; and compose and direct a realtime participant experience using the layers, and services performed by the service platform.

In some embodiments, the low-latency transmission protocol comprises steps of dividing the realtime participant experience into a plurality of regions, wherein the realtime participant experience includes full-motion video, wherein the full-motion video is enclosed within one of the plurality of regions; converting each portion of the realtime participant experience associated with each region into at least one of picture codec data and pass-through data; and smoothing a border area between the plurality of regions.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A non-transitory storage medium for storing modules executable by a processor comprising:
   a content player module presenting a streaming content received from a content distribution network (CDN);
   a user interface module operative to receive an user input;
   an experience agent module operative to receive one or more live realtime participant experiences as one or more separate layers transmitted from one or more realtime participant experience engines via a low-latency protocol and to present a real-time participant experience by composing the one or more separate layers and the streaming content into a single live stream;
   wherein the low-latency protocol to transmit the one or more live realtime participant experiences is operative to:
      divide each of the one or more live realtime participant experiences into a plurality of regions; and
      encode a first region of the plurality of regions with a first codec and a second region of the plurality of regions with a second codec; and
   wherein the storage medium further comprises a sentio codec operative to encode and decode data streams corresponding to different senses and dimensions of an experience.

2. The storage medium of claim 1, wherein the experience agent module is operative to overlay the one or more separate layers and streaming content.

3. The storage medium of claim 1, wherein the experience agent module is operative to communicate with one or more non-realtime services.

4. The storage medium of claim 1, wherein the experience agent module comprises a video ensemble application programming interface (API) and wherein the video ensemble API is operative to receive a video ensemble realtime participant experience from at least one of the one or more realtime participant experience engines.

5. The storage medium of claim 1, wherein the experience agent module comprises a synch digital video recorder (DVR) application programming interface (API) and wherein the synch DVR API is operative to receive a synch DVR realtime participant experience from at least one of the one or more realtime experience engines.

6. The storage medium of claim 1, wherein the experience agent module comprises a chalktalk application programming interface (API) and wherein the chalktalk API is operative to receive a chalktalk realtime participant experience from at least one of the one or more realtime experience engines.

7. The storage medium of claim 1, wherein the experience agent module comprises a virtual experience application programming interface (API) and wherein the virtual experience API is operative to receive a realtime participant virtual experience from at least one of the one or more realtime experience engines.

8. The storage medium of claim 3, wherein the experience agent module comprises a content application programming interface (API) and wherein the content API is operative to receive a streaming content search information from a non-realtime service.

9. The storage medium of claim 3, wherein the experience agent module comprises a friends application programming interface (API) and wherein the friends API is operative to receive friends information from a non-realtime service.

10. The storage medium of claim 1, the experience agent module comprises an explore engine to provide an interface to explore available contents.

11. The storage medium of claim 1, wherein the streaming content is a live streaming content received from the CDN.

12. The storage medium of claim 1, wherein the streaming content is an on-demand streaming content received from the CDN.

13. The storage medium of claim 1, the sentio codec is operative to synchronize a presentation of the one or more separate layers into the single live stream.

14. The storage medium of claim 1, wherein the experience agent module is operative to communicate with one or more non-realtime services via a human-readable data interchange format.

15. storage medium of claim 1, wherein the content player module is operative to present a streaming content controlled by a digital rights management (DRM).

16. A system for generating multi-dimensional realtime participant experiences, the system comprising:
   a plurality of realtime experience engines; and a plurality of non-realtime services; and
   a sentio codec coupled to the plurality of the realtime experience engines operative to encode and decode multiple dimensions of perception related data streams for the plurality of the realtime experience engines;

wherein each of the realtime experience engines is operative to compose and transmit a realtime participant experience to an experience agent module on a remote device via a low-latency protocol and communicate with one or more non-realtime services;

wherein each of the non-realtime services is operative to communicate with the experience agent module, and is further operative to communicate with at least one of the plurality of realtime experience engines;

wherein the plurality of non-realtime services comprises a content service operative to receive a streaming content search result from a content distribution network (CDN); and wherein the low-latency protocol to transmit the realtime participant experience is operative to:
divide the realtime participant experience into a plurality of regions; and
encode a first region of the plurality of regions with a first codec and a second region of the plurality of regions with a second codec.

17. The system of claim 16, wherein at least one of the plurality of realtime experience engines is operative to convert a plurality of realtime participant experiences into a single live stream for the experience agent module.

18. The system of claim 16, wherein the plurality of realtime experience engines includes an experience composition engine operative to compose a single live participant experience from experience layers received from the plurality of realtime experience engines, the plurality of non-realtime services, the CDN, or any combination thereof.

19. The system of claim 16, wherein the plurality of non-realtime services comprises an account service operative to maintain an account information including friends information and user devices information.

20. The system of claim 19, wherein the plurality of non-real-time services comprises a group formation service operative to form a group based on the account information from the account service.

21. The system of claim 16, wherein the plurality of non-real-time services comprises a presence service operative to generate and transmit a presence notification.

22. The system of claim 16, wherein the plurality of realtime experience engines comprises a video ensemble engine operative to transmit a video ensemble realtime participant experience.

23. The system of claim 16, wherein the plurality of realtime experience engines comprises a synch digital video recorder (DVR) engine operative to transmit a synch DVR realtime participant experience.

24. The system of claim 16, wherein the plurality of realtime experience engines comprises a synch chalktalk engine operative to transmit a synch chalktalk realtime participant experience, the synch chalktalk realtime experience providing an interactive drawing synchronized across multiple participant devices.

25. The system of claim 16, wherein the plurality of realtime experience engines comprises a virtual experience engine operative to transmit a realtime participant virtual experience.

26. The system of claim 16, wherein at least one of the realtime experience engines is operative to generate an ensemble of realtime participant experiences and transmit each realtime participant experience of the ensemble to the experience agent module.

27. A system for composing and directing multi-dimensional realtime participant experiences, the system comprising:
a content distribution network (CDN) infrastructure including an origin content server and a plurality of surrogate content servers, the CDN infrastructure operable to distribute content across various geographic locations;
a realtime experience engine;
a non-realtime service; and
a device including a content player presenting a streaming content received from the CDN infrastructure, the device further including an experience agent module presenting one or more live realtime participant experiences transmitted from the realtime experience engine via a low-latency protocol;
wherein the realtime experience engine is operative to transmit one or more realtime participant experiences to the experience agent module via a low-latency protocol and communicate with the non-realtime service;
wherein the non-realtime service is operative to communicate with the experience agent module, and communicate with the realtime experience engine;
wherein the experience agent module includes a sentio codec operative to encode or decode perception-related data streams associated with the one or more real-time participant experiences received from the realtime experience engine; and
wherein the low-latency protocol to transmit the realtime participant experience is operative to:
divide the realtime participant experience into a plurality of regions; and
encode a first region of the plurality of regions with a first codec and a second region of the plurality of regions with a second codec.

28. The system of claim 27, wherein the device further comprises a user interface operative to receive an input from a user of the device to interact with the one or more live participant experiences presented on the device.

29. The system of claim 27, wherein the realtime experience engine comprises a realtime experience engine operative to compose and direct a video ensemble realtime participant experience, a synch DVR realtime participant experience, synch chalktalk realtime participant experience, a realtime participant virtual experience, or any combination thereof.

30. A system for composing and directing multi-dimensional realtime participant experiences, the system provided by a service provider for use by an experience provider, the system comprising:
an experience server including:
a first experience agent, the first experience agent including a first sentio codec for encoding and decoding multi-dimensional data streams; and
an experience composition engine;
a plurality of devices, wherein each device includes a specific experience agent operative to communicate with the experience server;
a content server in communication with the experience server and operable to provide a content layer to the experience composition engine, the content server being part of a content distribution network (CDN) infrastructure including an origin content server and a plurality of surrogate content servers, the CDN infrastructure operable to distribute content to participants across various geographic locations;
a service platform in communication with and operable to provide services, for contributing experience dimensions to the experience composition engine, to the plurality of devices and the experience server, the service platform including:
a plurality of service engines; and
a second experience agent including an application programming interface (API) and a second sentio codec, the services of the plurality of service engines exposed via the API; and wherein the experience composition engine is operable to:
receive, via low latency transmission protocol, experience layers including the content layer from the content server and the plurality of devices;
request, via the first experience agent, the services from the plurality of service engines via the API; and
compose and direct a realtime participant experience using the layers, and services performed by the service platform;

wherein the low-latency transmission protocol is operative to:
divide the realtime participant experience into a plurality of regions;
encode a first region of the plurality of regions with a first codec and a second region of the plurality of regions with a second codec.

* * * * *